United States Patent [19]

Jahn et al.

[11] Patent Number: 5,403,070
[45] Date of Patent: Apr. 4, 1995

[54] SAFETY BELT FASTENING TO A HOLDING FIXTURE

[75] Inventors: Walter Jahn, Ehningen; Georg Bauer, Heilbronn, both of Germany

[73] Assignee: Mercedes Benz, Stuttgart, Germany

[21] Appl. No.: 79,908

[22] Filed: Jun. 23, 1993

[30] Foreign Application Priority Data

Jun. 27, 1992 [DE] Germany ............... 42 21 245.6

[51] Int. Cl.6 .................................... B60R 22/00
[52] U.S. Cl. ..................... 297/468; 280/801.1
[58] Field of Search .............. 297/468, 481, 482; 280/801.1; 296/68.1

[56] References Cited

U.S. PATENT DOCUMENTS

| 2,700,412 | 1/1955 | Evans | 297/468 X |
| 2,794,654 | 6/1957 | Sullivan | |
| 3,258,293 | 6/1966 | Sharp | 297/481 X |
| 4,231,616 | 11/1980 | Painter | 297/481 |
| 4,770,459 | 9/1988 | Nakaiwa | 280/801.1 X |
| 5,074,590 | 12/1991 | DiPaola | 297/468 X |

FOREIGN PATENT DOCUMENTS

| 2449456A | 1/1980 | France . | |
| 2931552A | 2/1981 | Germany . | |
| 3032719 | 3/1982 | Germany . | |
| 3136270A | 4/1983 | Germany . | |
| 3136270 | 8/1985 | Germany . | |
| 3539538 | 6/1989 | Germany . | |
| 8149841 | 9/1983 | Japan | 280/801.1 |
| 9014548 | 1/1984 | Japan | 280/801.1 |
| 2039342 | 2/1987 | Japan | 280/801.1 |
| 4-092745 | 3/1992 | Japan | 280/801.1 |
| 817590 | 8/1959 | United Kingdom | 297/468 |
| 989541 | 4/1965 | United Kingdom | 297/468 |
| 2044074 | 2/1980 | United Kingdom . | |
| 2208468 | 8/1987 | United Kingdom . | |

Primary Examiner—Peter R. Brown
Assistant Examiner—David E. Allred
Attorney, Agent, or Firm—Evenson, McKeown, Edwards & Lenahan

[57] ABSTRACT

From a holding fixture for a safety belt fastening arrangement there emanates, on two opposite sides, in each case one elongated connecting part, by virtue of whose free end a locking part of a safety belt is secured. These two connecting parts are formed exclusively from a safety belt strap and are held together, on the holding fixture side, by at least one stitch seam.

4 Claims, 1 Drawing Sheet

SAFETY BELT FASTENING TO A HOLDING FIXTURE

BACKGROUND AND SUMMARY OF THE INVENTION

The invention relates to a safety belt fastening arrangement including a holding fixture with opposite sides, and first and second elongated connecting parts emanating from the respective opposite sides of the holding fixture and having respective free ends for securing respective locking parts of a safety belt, the connecting parts comprising a belt strap section.

From German Patent Document PS 31 36 270, a safety belt fastening arrangement is known, by which a locking part of two safety belts is respectively secured by a common holding fixture to a vehicle body. As the connecting part between the holding fixture and one of the locking parts (belt lock), a wire cable is chosen, which is clamped by means of the holding fixture to the body. A belt lock tongue is connected by a belt strap to a loop on the holding fixture. Here a clamp fixture for the securement of the connecting parts must be provided for the wire cable and, in addition to this, a stitching of the belt strap to the loop must be performed.

From German Patent Document DOS 30 32 719 and German Patent Document PS 35 39 538, a belt strap acting as a connecting part is known, which belt strap is placed around a holding part so as to form a loop and is stitched up close to the holding part. There is no mention here concerning the common securement of the two locking parts.

An object of the invention is to configure a safety belt fastening arrangement of the generic type such that it is easier to produce.

This object is achieved by providing an arrangement wherein the connecting parts are formed exclusively from the belt strap and are held together on the holding fixture side by at least one stitch seam.

The two connecting parts emanating from a common holding fixture, and leading respectively to a locking part, enable the locking parts of two safety belts disposed, for example, side by side on a rear seat bench, to be secured in a simple manner to a vehicle body. By virtue of the belt strap, these two locking parts can be flexibly articulated over a wide section, thereby accommodating a large distance from the holding fixture to the usable position of the locking parts to be bridged. The belt strap additionally enables the locking parts to be embedded without interference in a seat cushion when not in use. A securement of the connecting parts, comprising the belt strap, to the holding fixture is effected by at least one stitch seam, which simultaneously secures both connecting parts to the holding fixture and thus minimizes the effort involved in fastening the two connecting parts.

The effort involved in fitting the locking parts is additionally reduced in especially preferred embodiments by a one-piece belt strap, which is only deflected at the holding fixture and is thereby sub-divided into two belt strap sections, which respectively secure a locking part and do not here need to be individually secured to the holding fixture.

The stitch seam or a plurality of adjoining seams can also additionally hold the free end of a connecting part which, emanating from the holding fixture, has been looped into a locking part and guided back in the direction of the holding fixture and is here stitched up by the stitch seam to the other connecting part. In this instance, a greater tensile load can be introduced into the holding fixture if this guided-back free end of the connecting part is guided through the holding fixture and then likewise stitched up, according to especially preferred embodiments.

In an embodiment which is particularly simple to produce, the holding fixture exhibits, in a vertically projecting section, only one deflecting slot into which the connecting parts are looped. Here, it is favorable in terms of a constant securement of the connecting parts to the holding fixture if at least one stitch seam is disposed close to an end edge of the vertically projecting section, so that the belt strap cannot become twisted in the deflecting slot.

A simple fitting of the belt strap or of two belt straps to the holding fixture is obtained if a connecting part, from its outlet side on the deflecting slot of the holding fixture, is guided back to and through the locking part and, from the same side, to the deflecting slot of the holding fixture, after which all belt strap pieces which are adjoining each other and have been guided through the deflecting slot are stitched together at the same height by one or more seams and are held against the holding fixture.

Other objects, advantages and novel features of the present invention will become apparent from the following detailed description of the invention when considered in conjunction with the accompanying drawings.

DETAILED DESCRIPTION OF THE DRAWINGS

Figure 1:
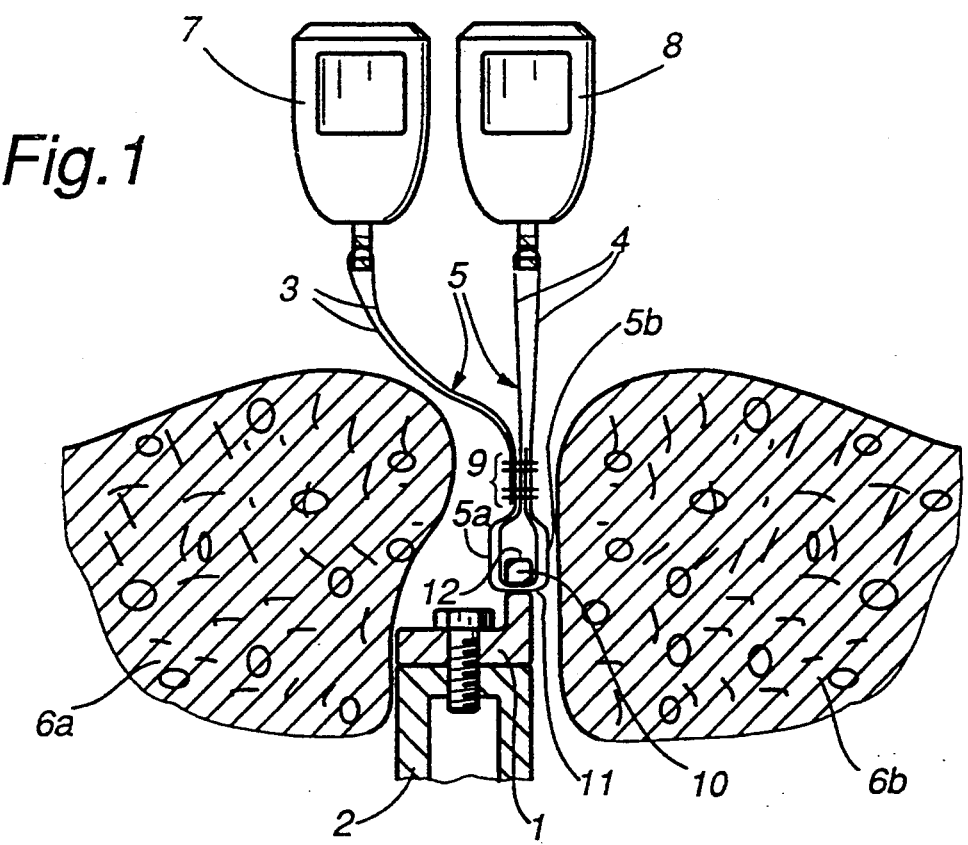
FIG. 1 is a schematic view which shows a fastening arrangement of two belt locks to a holding fixture assigned to a rear seat bench of a vehicle constructed according to a preferred embodiment of the invention.

In FIG. 1, a safety belt fastening arrangement is schematically depicted in which, from a holding fixture 1 screwed to a vehicle body 2 (not further represented), there emanates in each case on the two opposite sides, one elongated connecting part 3 and 4. Both connecting parts 3, 4 are formed from a one-piece belt strap 5, which is deflected at the holding fixture 1 and is thereby subdivided into two belt strap sections 5a and 5b, these forming the connecting parts 3 and 4, respectively. The connecting parts 3 and 4 respectively serve to secure a respective locking part 7 or 8. The locking parts 7, 8 are formed in each case by a strap lock, disposed flexibly and at a variable distance to the holding fixture 1. The locking parts 7 and 8, respectively, form parts of safety belt arrangements which are assigned to two different adjacent seats 6a and 6b of a rear seat bench of a vehicle.

A simple and fast fitting of the connecting parts 3 and 4 to the holding fixture 1 is obtained by a stitch seam 9, which acts, by virtue of the connection of the belt strap 5 of both connecting parts 3 and 4, as a common securement for both connecting parts 3 and 4. For each connecting part 3 or 4, a separate belt strap can also be provided, the ends of which must then respectively be secured to the holding fixture 1 or in the stitch seam 9.

This stitch seam 9 is able to connect all belt strap sections emanating from the holding fixture 1 close to the holding fixture 1. Preferred embodiments are not restricted to just one seam line but can also comprise a plurality of seams.

In this illustrative embodiment, the free end of a connecting part 3 or 4, respectively, is looped into the locking part 7 or 8, respectively, and guided back in the direction of the holding fixture 1 and stitched up by the stitch seam 9 (or the stitch seams) to the respective other connecting part, so that the respective locking part 7 or 8 is also secured by the stitch seam 9.

In the case of the connecting part 4, the free end, after being looped through the locking part 8, is guided back through the holding fixture 1 and then stitched up in the common stitch seam 9. The belt strap 5 is thereby guided twice through the holding fixture 1 and is thus able to withstand higher loads.

For a simple fitting operation, the holding fixture 1 is provided in a vertically projecting section 10 with a deflecting slot 11 forming a through-opening, into which deflecting slot the connecting parts 3 or 4 are looped as a one-piece belt strap 5. In order to achieve a twist-proof securement of the connecting parts 3 and 4, the stitch seam 9 is disposed close to an end edge 12 of the vertically projecting section 10.

Figure 2:
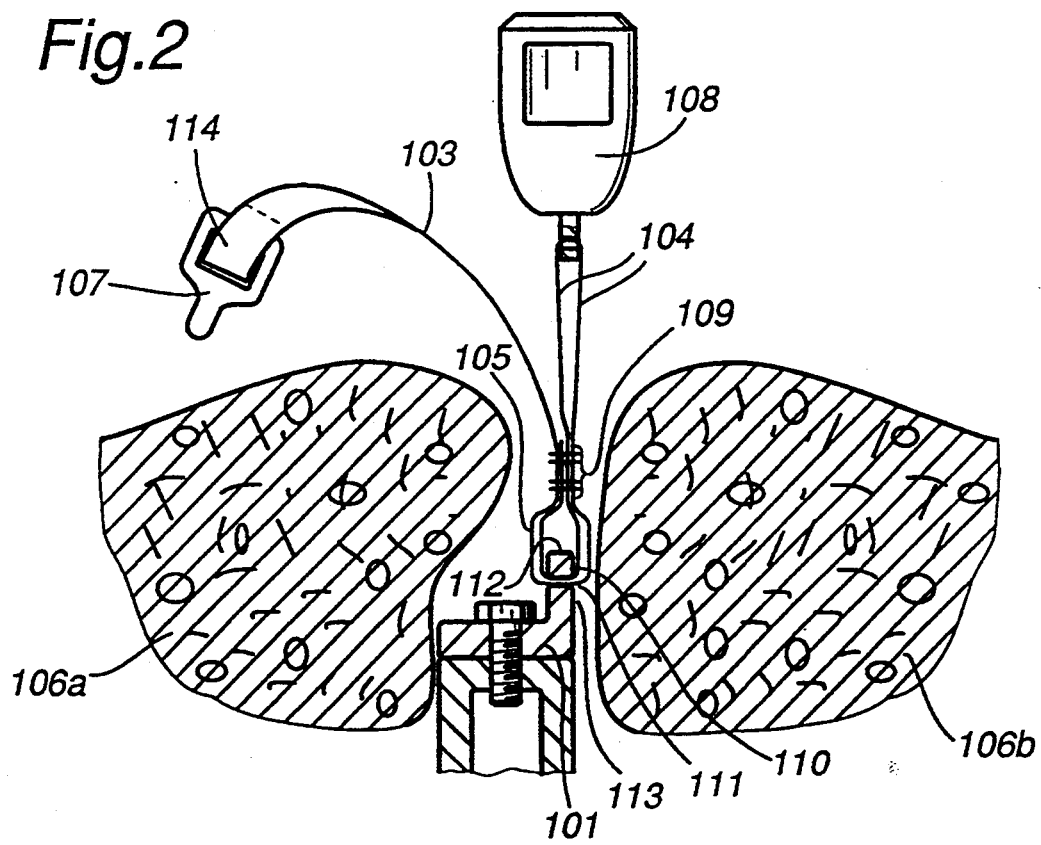
FIG. 2 is a schematic view which shows a fastening arrangement of a belt lock and of a belt lock tongue to a common holding fixture, exhibiting a different belt strap guidance from that shown in FIG. 1.

The illustrative embodiment in FIG. 2 differs from that described above in that the belt strap 105, from its outlet side 113 on the deflecting slot 111 of the holding fixture 101, is guided back to and through the locking part 108 and, from the same side, to the deflecting slot 111 of the holding fixture 101. This belt strap guidance makes it easier for the belt strap 105 to be looped into the holding fixture 101, the free end of the connecting part 104 (belt lock) being guided in turn through the deflecting slot 111 and then held in the stitch seam 109, which connects all mutually adjoining belt sections and secures them to one another. To the other connecting part 103 there is in this case firmly stitched, as a locking part 107, a belt lock tongue, a loop 114 being thereby formed.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Safety belt fastening arrangement including:
   a belt strap;
   a holding fixture with opposite sides;
   first and second elongated connecting parts having respective free ends emanating from the respective opposite sides of the holding fixture for securing respective locking parts of a safety belt, the connecting parts each comprising a belt strap section, wherein the connecting parts are formed exclusively from the belt strap and are held together near the holding fixture by at least one stitch seam;
   wherein the holding fixture exhibits a deflecting slot in a vertically projecting section into which slot the connecting parts are looped; and
   wherein one of said connecting parts extends toward the locking part from an outlet side on the deflecting slot of the holding fixture wherein the one of the connecting parts is deflected at the locking part and extends from said outlet side back to and through the deflecting slot of the holding fixture.

2. Safety belt fastening arrangement according to claim 1, wherein at least one stitch seam is disposed close to an end edge of the vertically projecting section.

3. Safety belt fastening arrangement according to claim 1, wherein the respective locking parts are assigned to two different vehicle seats.

4. Safety belt fastening arrangement according to claim 1, where the holding fixture is disposed between two different vehicle seats, and wherein the respective locking parts are assigned to the respective two different vehicle seats.

* * * * *